United States Patent
Nomura et al.

(10) Patent No.: US 7,645,102 B2
(45) Date of Patent: Jan. 12, 2010

(54) DRILL HEAD FOR DEEP HOLE MACHINING

(75) Inventors: Takuji Nomura, Hyogo (JP); Makoto Sakai, Hyogo (JP)

(73) Assignee: Unitac, Inc. (JP)

( * ) Notice: Subject to any disclaimer, the term of this patent is extended or adjusted under 35 U.S.C. 154(b) by 0 days.

(21) Appl. No.: 11/755,840

(22) Filed: May 31, 2007

(65) Prior Publication Data

US 2007/0237592 A1 Oct. 11, 2007

Related U.S. Application Data

(63) Continuation of application No. PCT/JP2006/310019, filed on May 19, 2006.

(30) Foreign Application Priority Data

Jun. 6, 2005 (JP) ............................. 2005-165166

(51) Int. Cl.
*B23B 51/00* (2006.01)

(52) U.S. Cl. ..................... 408/199; 408/83; 408/227; 408/705

(58) Field of Classification Search ................ 408/57, 408/59, 79–83, 199, 223, 227, 713, 705, 408/58; *B23B 41/02*
See application file for complete search history.

(56) References Cited

U.S. PATENT DOCUMENTS

| | | | | |
|---|---|---|---|---|
| 2,882,765 A | * | 4/1959 | Andreasson | .................. 408/59 |
| 2,969,699 A | * | 1/1961 | Kleine | .......................... 408/199 |
| 3,591,305 A | * | 7/1971 | Aichhorn et al. | ............ 408/161 |
| 4,076,445 A | * | 2/1978 | Kress et al. | .................. 408/226 |
| 4,125,342 A | * | 11/1978 | Kress | ......................... 408/179 |
| 4,279,550 A | * | 7/1981 | Kress et al. | ................... 408/59 |
| 4,293,252 A | * | 10/1981 | Kress et al. | ................. 408/224 |
| 4,425,063 A | * | 1/1984 | Striegl | ......................... 408/81 |
| 4,616,964 A | * | 10/1986 | Nomura | ...................... 408/144 |
| 5,238,335 A | * | 8/1993 | Nomura | ...................... 408/59 |

FOREIGN PATENT DOCUMENTS

| | | | |
|---|---|---|---|
| DE | 3424630 A1 | * | 1/1986 |
| GB | 1556661 A | * | 11/1979 |
| JP | 60221210 A | * | 11/1985 |
| JP | 06170640 A | * | 6/1994 |
| JP | 2001-079706 | | 3/2001 |
| JP | 2004-167645 | | 6/2004 |

\* cited by examiner

*Primary Examiner*—Daniel W Howell
(74) *Attorney, Agent, or Firm*—St. Onge Steward Johnston & Reens LLC

(57) ABSTRACT

The invention provides a drill head for deep hole machining capable of raising circularity and straightness of a hole and improving precision of hole machining. In the drill head for deep hole machining constituted by fixing a cutting blade to a tip surface of a head body and fixing guide pads to a periphery of a tip of the head body, the length Lm of a margin, which is formed at a tip side of a periphery of the cutting blade in a drill rotating direction, in an axis direction is made substantially the same as the length Lp of the guide pads in the axis direction, and a top end and rear end of the margin are substantially aligned with a top end and rear end of the guide pads, respectively, in a circumference direction.

5 Claims, 5 Drawing Sheets

PRIOR ART

PRIOR ART

US 7,645,102 B2

DRILL HEAD FOR DEEP HOLE MACHINING

RELATED APPLICATIONS

This is a continuation of PCT/JP2006/310019, having an international filing date of May 19, 2006, which claims priority from Japanese Application No. JP2005-165166, filed Jun. 6, 2005.

TECHNICAL FIELD

The present invention relates to a drill head for deep hole machining constituted by fixing a cutting blade to a tip surface of a head body and fixing guide pads to a periphery of a tip of the head body, more particularly, it relates to a drill head used for deep hole machining by the BTA system and ejecting system.

BACKGROUND ART

As a deep hole machining system, three systems, a gun drill system, BTA system and ejecting system, have been generally known. In a drill head used in the gun drill system, a V-groove for swarf ejection is formed throughout the whole length of a head body. In this system, high-pressure cutting oil is fed to a tip of a cutting blade through the inside of a shank of a drill, the swarf generated by the cutting blade is broken by the high-pressure cutting oil, and the broken swarf is forcibly ejected through the V-groove.

A drill head used in the BTA system is constituted by fixing a cutting blade to a tip surface of a head body attached to a tip of a pipe-shaped boring bar and fixing guide pads to a periphery of a tip of the head body. In this system, a casing in which a guide bush is built is arranged adjacently to an end surface of a material to be cut. Further, when cutting oil is pressurized and fed from an oil feeding port with end surfaces of the guide bush and the casing sealed with a sealing material, the cutting oil reaches the cutting blade from a gap between the boring bar and the guide bush through a gap between a cutting hole of the material to be cut and a peripheral surface of the drill head, flows into the boring bar from the cutting blade via a center through hole of the drill head, sweeps the swarf generated by the cutting blade away, and ejects the swarf from an ejecting port.

Additionally, a drill head used in the ejecting system is constituted by fixing the cutting blade to the tip surface of the head body attached to a tip of a shank constituted by a double tube which forms a cutting oil feeding path between an outer tube and an inner tube, and by fixing the guide pads to the periphery of the tip of the head body, and an opening which communicates with a hollow part of the inner tube is formed in the head body. In this ejecting system, most of the cutting oil fed from the oil feeding port of the casing during cutting goes out from an oil hole through the cutting oil feeding path between the outer tube and the inner tube, reaches the cutting blade through the gap between the cutting hole of the material to be cut and the peripheral surface of the drill head, flows into the inner tube from the opening, and a part of the cutting oil directly flows into the inner tube. Then, the inner pressure of the inner tube becomes negative, a pressure difference is generated, and an absorbing force is generated. Swarf is absorbed by a vacuum effect of the absorbing force and ejected from the ejecting port.

FIG. 3(a) is a side view showing a conventional drill head used in the BTA system and ejecting system, and FIG. 3(b) is an end view thereof. In FIG. 3, the reference symbol 1 denotes a hollow-shaped head body, a cutting blade 12 constituted by a single blade is fixed to the tip surface of the head body 1, guide pads 13 and 14 are fixed to the periphery of the tip of the head body 1, and the reference symbol 5 denotes a hole for ejecting swarf and cutting oil. FIG. 4(a) is a side view showing another conventional drill head similarly used in the BTA system and ejecting system, and FIG. 4(b) is an end view thereof. In FIG. 4, cutting blades 12a, 12b, and 12c, which constitute a divided blade, are fixed to the tip surface of the head body 1, and the guide pads 13 and 14 are fixed to the periphery of the tip of the head body 1.

DISCLOSURE OF THE INVENTION

Problem to be Solved by the Invention

In a conventional drill head used in the above-described BTA system and ejecting system, as shown in FIG. 3(a) and FIG. 4(a), since the length Lp of the guide pads 13 and 14 in an axis direction is larger than the length Lm of a margin 6, which is formed at a tip side of a periphery of the cutting blades 12 and 12a in a drill rotating direction, in the axis direction, circularity and straightness of a hole to be machined is lowered and precision of hole machining is lowered. When a drill head H penetrates a material W to be cut and projects from a top end of a hole O at the time of finishing hole machining as shown in FIG. 5, the guide pads 13 and 14, for which the length Lp in the axis direction is large, enters the hole O, and then the cutting blade 12a, for which the length Lm of the margin 6 is small, enters the hole O. As a result, there arises a trouble such that the top end of the hole O is damaged by the cutting blade 12a in pulling the drill head back. Moreover, FIG. 5 shows a state where the guide pads 13 and 14 are in the hole O and the cutting blade 12a projects from the top end of the hole O, and shows a state where an axis line of the head body 1 is tilted from G to G'. Additionally, in FIG. 5, the reference symbols 19 and 20 denote an outer tube and an inner tube respectively.

A reason why the precision of hole machining is lowered in the case where the length Lp of each of the guide pads 13 and 14 in the axis direction is larger than the length Lm of the margin 6 of the cutting blade in the axis direction as described above is conceived as follows: Cutting resistance generated against the cutting blades 12 and 12a during cutting is received by a hole wall of the material W to be cut via the guide pad 13 (bearing guide pad) and the guide pad 14 (size determining guide pad) as a vector of a main component force (main cutting force) and a vector of a thrust force approximately orthogonal to the main component force. The margin 6 formed at the tip side of the periphery of the cutting blades 12 and 12a in the drill rotating direction supports the cutting blades 12 and 12a, guides the drill head so that it can advance straight, and makes the cutting stable. Therefore, a deep hole having a good circularity and straightness cannot be obtained unless pressure balance between the margin 6 and the guide pads 13 and 14 is secured. In the conventional drill head, however, since the length Lp of the guide pads 13 and 14 in the axis direction is larger than the length Lm of the margin 6 in the axis direction, pressure unbalance between the margin 6 and the guide pads 13 and 14 arises. Therefore, the circularity and straightness of the hole is lowered, and the precision of hole machining is lowered.

In view of the above problem, the present invention was made, and it is an object of the present invention to provide a drill head for deep hole machining capable of raising the circularity and straightness of the hole and improving the precision of hole machining.

Means for Solving the Problem

Means for solving the above problem will be described with use of the reference symbols in the embodiments described below. The invention according to claim 1 is a drill head for deep hole machining constituted by fixing cutting blade 2 or cutting blades 2a to 2c to a tip surface of a head body 1 and fixing guide pads 3 and 4 to a periphery of a tip of the head body 1, wherein the length Lm of a margin 6, which is formed at a tip side of a periphery of the cutting blades 2 and 2a in a drill rotating direction, in an axis direction is made substantially the same as the length Lp of the guide pads 3 and 4 in the axis direction and a top end and rear end of the margin 6 are substantially aligned with a top end and rear end of the guide pads 3 and 4 in a circumference direction respectively.

Effect of the Invention

An effect of the present invention by the above solving means will be described with use of the reference symbols in the embodiments described below. In the invention of claim 1, since the length Lm of a margin 6, which is formed at a tip side of a periphery of the cutting blade 2 in a drill rotating direction, in an axis direction is made substantially the same as the length Lp of the guide pads 3 and 4 in the axis direction, and since a top end and rear end of the margin 6 in the axis direction are substantially aligned with a top end and rear end of the guide pads 3 and 4 in a circumference direction respectively, a pressure balance between the margin 6 and the guide pads 3 and 4 can be secured. Thus, cylindricality, circularity, straightness and the like of a hole are raised, and precision of hole machining is improved.

| | Description of the Symbols |
|---|---|
| 1 | head body |
| 2 | cutting blade constituted by single blade |
| 2a to 2c | cutting blades constituting divided blade |
| 3, 4 | guide pad |
| 6 | margin |
| Lm | length of margin in axis direction |
| Lp | length of guide pad in axis direction |

BEST MODE FOR CARRYING OUT THE INVENTION

Figure 1:
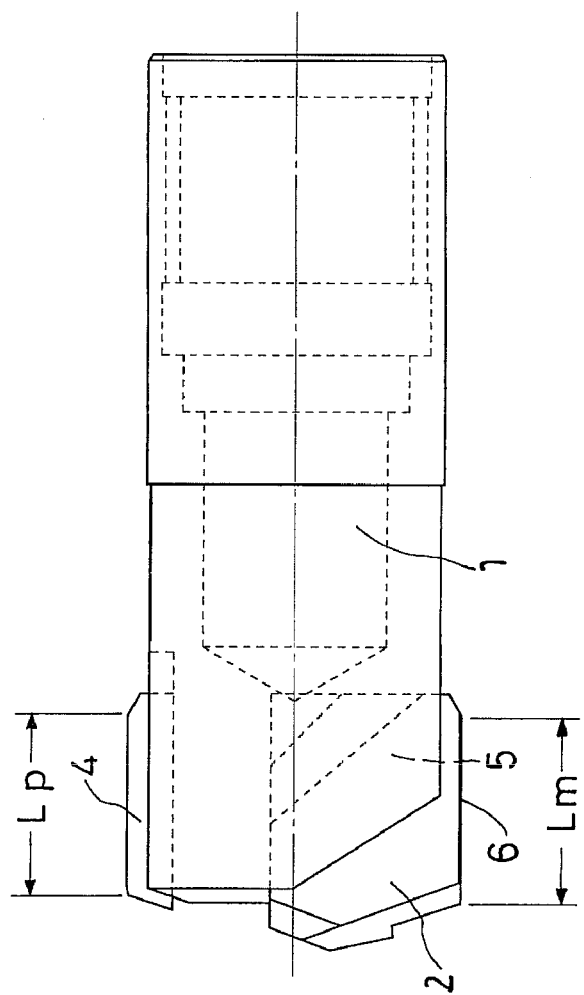
FIG. 1(*a*) is a side view showing a drill head of the present invention used in the BTA system and ejecting system, and FIG. 1(*b*) is an end view thereof.
Figure 1:
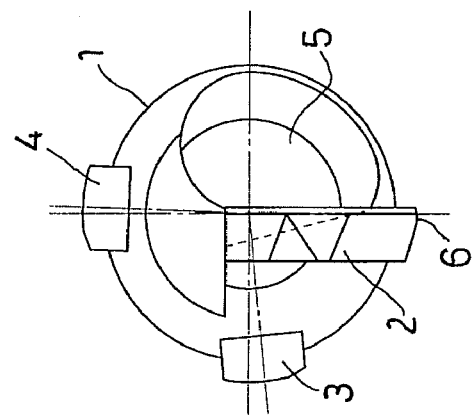

A preferred embodiment of the present invention will be described hereinafter with reference to FIG. 1 and FIG. 2. FIG. 1(*a*) is a side view showing a drill head of the present invention used in the BTA system and ejecting system, and FIG. 1(*b*) is an end view thereof. In the drill head of the present invention shown in FIG. 1, a cutting blade 2 constituted by a single blade is fixed to a tip surface of a head body 1, and guide pads 3 and 4 are fixed to a periphery of a tip of the head body 1. Further, the cutting blade 2 and the guide pads 3 and 4 are formed so that the length Lm of a margin 6, which is formed at a tip side of the periphery of the cutting blade 2 in a drill rotating direction, in an axis direction becomes substantially the same as the length Lp of the guide pads 3 and 4 in the axis direction. Furthermore, as shown in FIG. 1(*a*), the cutting blade 2 and the guide pads 3 and 4 are attached to the head body 1 so that a top end and rear end of the margin 6 in the axis direction are substantially aligned with a top end and rear end of the guide pads 3 and 4, respectively, in a circumference direction. Moreover, in FIG. 1, the reference symbol 5 denotes a hole for ejecting swarf and cutting oil.

Figure 2:
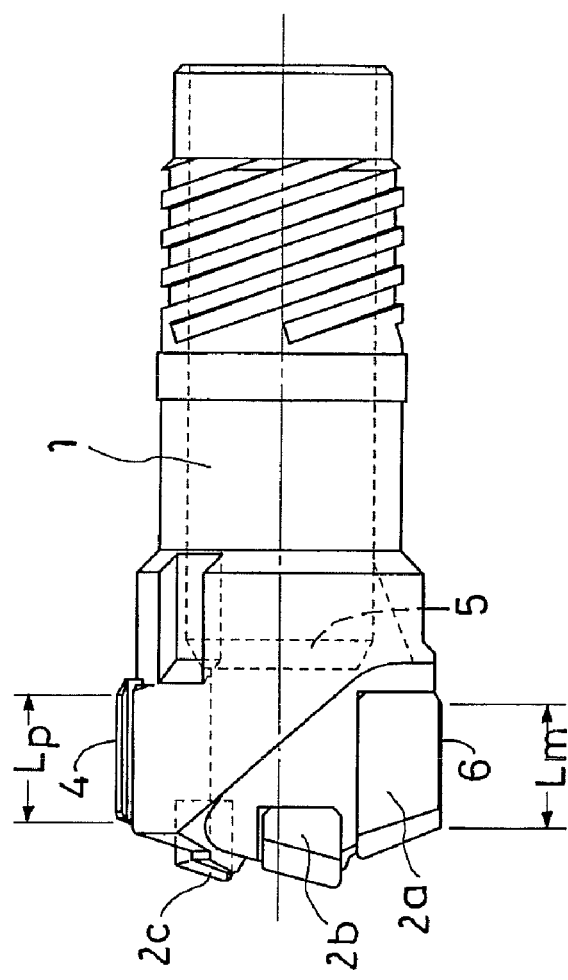
FIG. 2(*a*) is a side view showing another drill head of the present invention, and FIG. 2(*b*) is an end view thereof.
Figure 2:
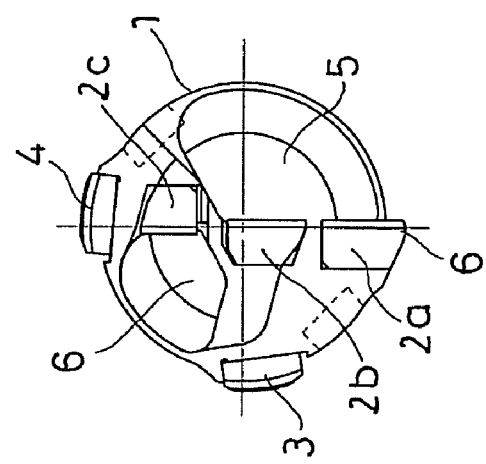
Figure 3:
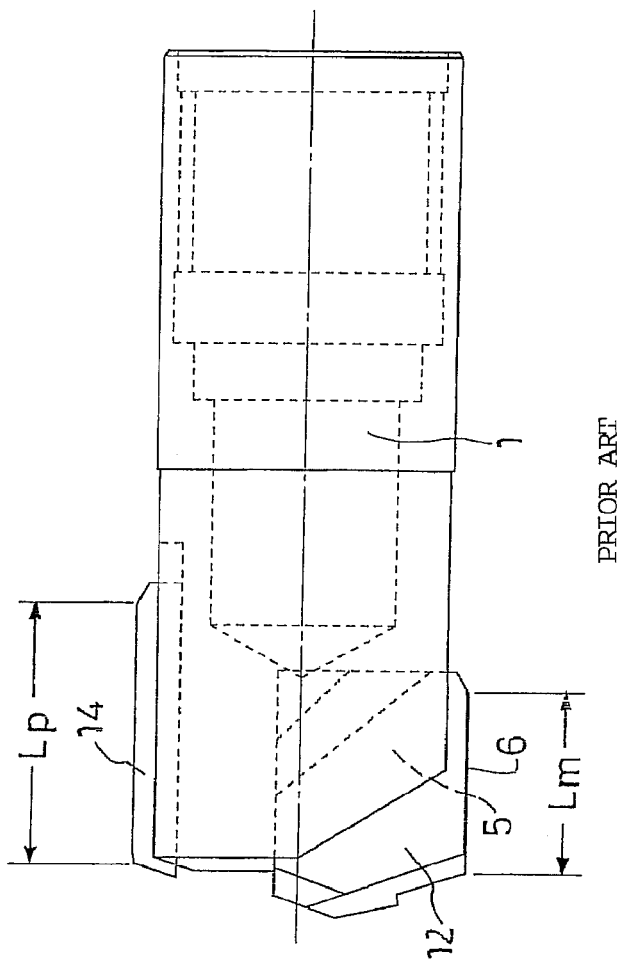
FIG. 3(*a*) is a side view showing a conventional drill head, and FIG. 3(*b*) is an end view thereof.
Figure 3:
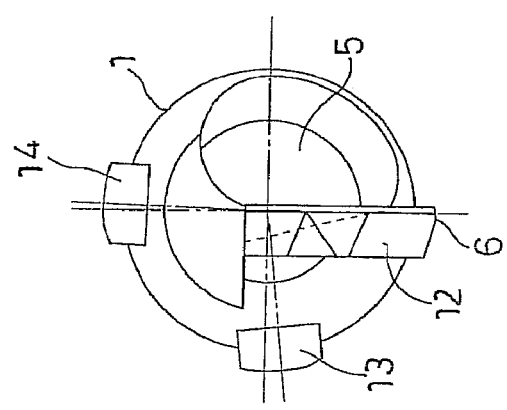
Figure 4:
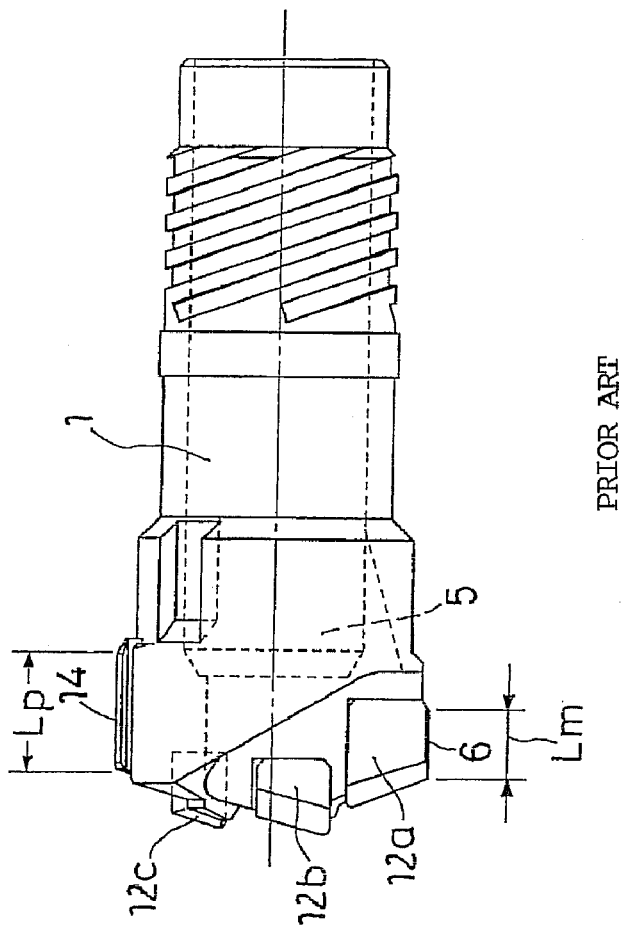
FIG. 4(*a*) is a side view showing another conventional drill head, and FIG. 4(*b*) is an end view thereof.
Figure 4:
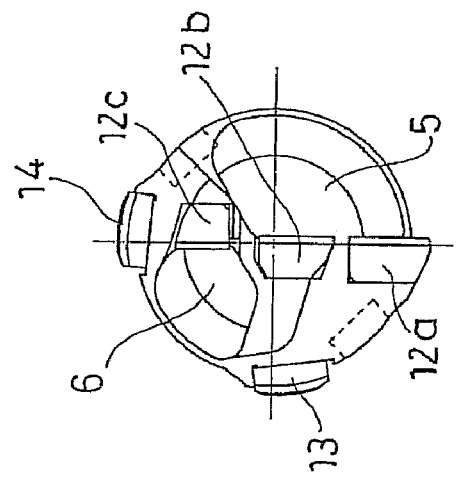
Figure 5:
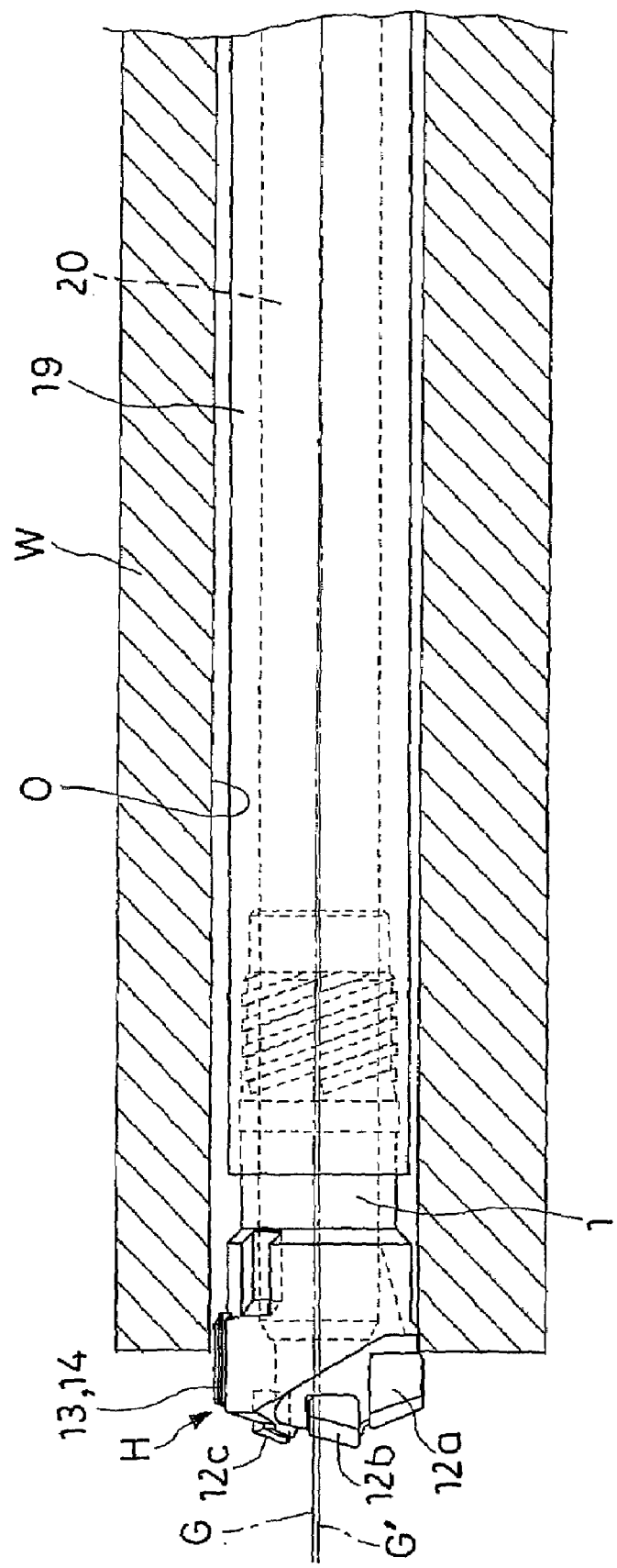
FIG. 5 is an explanatory view showing a state where the conventional drill head penetrates a material to be cut and projects from a top end of a hole at the time of finishing hole machining.

FIG. 2(*a*) is a side view showing another drill head of the present invention similarly used in the BTA system and ejecting system, and FIG. 2(*b*) is an end view thereof. In the drill head, the cutting blade 2, which constitutes a divided blade, are fixed to the tip surface of the head body 1, and the guide pads 3 and 4 are fixed to the periphery of the tip of the head body 1. Further, the cutting blade 2 and the guide pads 3 and 4 are also formed so that the length Lm of the margin 6, which is formed at the tip side of the periphery of the cutting blade 2 in the drill rotating direction, in the axis direction becomes substantially the same as the length Lp of the guide pads 3 and 4 in the axis direction. Furthermore, as shown in FIG. 2(*a*), the cutting blade 2 and the guide pads 3 and 4 are attached to the head body 1 so that the top end and rear end of the margin 6 in the axis direction are substantially aligned with the top end and rear end of the guide pads 3 and 4, respectively, in the circumference direction.

In drill heads of the present invention shown in FIG. 1 and FIG. 2, cutting resistance generated against the cutting blades 2 and 2a during cutting is received by a hole wall of a material to be cut via the guide pad 3 (bearing guide pad) and the guide pad 4 (size determining guide pad) as a vector of a main component force (main cutting force) and a vector of a thrust force approximately orthogonal to the main component force, and the margin 6 formed at the tip side of the periphery of the cutting blades 2 and 2a in the drill rotating direction supports the cutting blades 2 and 2a, guides the drill so that it can advance straight, and makes the cutting stable. However, in the drill heads of the present invention, the cutting blade 2 and the guide pads 3 and 4 are formed so that the length Lm of the margin 6, which is formed at the tip side of the periphery of the cutting blade 2 in the drill rotating direction, in the axis direction becomes substantially the same as the length Lp of the guide pads 3 and 4 in the axis direction, and the cutting blade 2 and the guide pads 3 and 4 are attached to the head body 1 so that the top end and rear end of the margin 6 in the axis direction are substantially aligned with the top end and rear end of the guide pads 3 and 4, respectively, in the circumference direction. Thus, pressure balance between the margin 6 and the guide pads 3 and 4 can be secured, thereby raising cylindricality, circularity, straightness and the like of a hole, and improving precision of hole machining.

In the above embodiment, as an example of the cutting blade attached to the head body 1, the cutting blade 2 constituted by the single blade as shown in FIG. 1, or the cutting blades 2a, 2b, and 2c which constitute a divided blade such that a single blade is divided into a plurality of blades, has been cited. However, cutting blades (single blades or divided blades) may be symmetrically arranged on the tip surface of the head body 1 in a diameter direction.

What is claimed is:

1. A drill head for deep hole machining comprising a cutting blade fixed to a tip surface of a head body and guide pads fixed to a periphery of a tip of the head body, wherein a drill head guiding and supporting margin is formed at a tip side of a periphery of the cutting blade in a drill rotating direction, the drill head guiding and supporting margin being operable to guide and support the drill head during drilling, and the length of the drill head guiding and supporting margin in an axis direction is substantially the same as the length of the guide pads in the axis direction wherein a top end and rear end of the drill head guiding and supporting margin are substantially aligned with a top end and rear end of the guide pads, respectively, in a circumference direction.

2. A drill head for deep hole machining according to claim 1, wherein the cutting blade attached to the tip surface of the head body is constituted by a single blade.

3. A drill head for deep hole machining according to claim 1, wherein the cutting blade attached to the tip surface of the head body is constituted by a divided blade arranged in a diameter direction of the head body.

4. A drill head for deep hole machining according to claim 1, wherein the cutting blade attached to the tip surface of the head body is constituted of a single blade or divided blades symmetrically arranged on the tip surface of the head body in the diameter direction.

5. A drill head for deep hole machining according to claim 1, wherein the guide pads fixed to the periphery of the tip of the head body include a bearing guide pad which receives a main cutting force generated by the cutting blade during cutting and a size determining guide pad which receives a thrust force approximately orthogonal to the main cutting force.

* * * * *